United States Patent [19]

Tischer

[11] Patent Number: 5,056,311
[45] Date of Patent: Oct. 15, 1991

[54] HYDROSTATIC STEERING DEVICE

[75] Inventor: Werner Tischer, Heubach-Lautern, Fed. Rep. of Germany

[73] Assignee: Zahnradfabrik Friedrichschafen, AG., Friedrichshafen, Fed. Rep. of Germany

[21] Appl. No.: 445,721

[22] Filed: Nov. 27, 1989

[30] Foreign Application Priority Data

Jun. 26, 1987 [DE] Fed. Rep. of Germany ....... 3721094
Jun. 22, 1988 [WO] PCT Int'l Appl. ... PCT/EP88/00544

[51] Int. Cl.$^5$ ............................................. F16D 31/02
[52] U.S. Cl. ........................................ 60/384; 60/387; 60/422; 60/450; 91/516; 91/517; 91/532; 180/132
[58] Field of Search .................. 60/384, 387, 422, 433, 60/450, 459, 426, 452; 91/516, 517, 532, 528; 180/132, 153, 158

[56] References Cited

U.S. PATENT DOCUMENTS

| 4,011,721 | 3/1977 | Yip . | |
|---|---|---|---|
| 4,332,303 | 6/1982 | deMaight | 180/132 |
| 4,553,389 | 11/1985 | Tischer et al. | 60/422 |
| 4,685,295 | 8/1987 | Christiansen et al. | 60/459 |

FOREIGN PATENT DOCUMENTS

| 170148 | 12/1984 | U.S.S.R. | 180/132 |
| 2111925 | 7/1983 | United Kingdom | 180/132 |

Primary Examiner—Edward K. Look
Assistant Examiner—F. Daniel Lopez
Attorney, Agent, or Firm—Albert M. Zalkind

[57] ABSTRACT

A hydrostatic steering device is provided with a pump connected with a reservoir, a steering valve, a controlled-volume pump that is capable of being activated by a steering wheel and with a steering cylinder. The steering mechanism has a variable working flow and a constant pilot flow, with the pilot stream flowing through a constant throttle and the pressure drop through the constant throttle serving as a control signal for the conveying flow in a pressure delivery line. The controlled-volume pump is coupled mechanically with an adjustment throttle through which the pilot flows. Between the constant throttle and the adjustment throttle lies a pressure compensator that is controlled by the adjustment throttle's differential pressure. To receive the load signal, a control line branches off between the constant throttle and the pressure compensator and leads to the pump or, in the case of a fixed displacement pump with a rear-position flow-dividing valve, to the flow-dividing valve.

7 Claims, 4 Drawing Sheets

HYDROSTATIC STEERING DEVICE

BACKGROUND OF THE INVENTION

The invention is concerned with a hydrostatic steering device.

BRIEF DESCRIPTION OF THE PRIOR ART

A hydrostatic steering mechanism is known from DE-PS 27 16 868, for example. The servosteering pressure control device described therein supplies two regulating devices, each of which is driven by a high-pressure pump through a hydraulic circuit. In the prior device, one hydraulic circuit is provided for a hydrostatic steering mechanism that has priority, and the second hydraulic circuit is provided for the vehicle's working hydraulic system—for example, a shovel-lifting device or the like. A variable displacement pump is used to control the pressure if only one hydrostatic steering device is to be supplied with pressure medium by the variable displacement pump. If additional pressure medium is to be supplied to a second working circuit, a fixed displacement pump can be used, together with a rear-position flow-dividing valve, for the two hydraulic circuits instead of a variable displacement pump.

However, a problem with such a mechanism arises from the fact that the control signal does not get to the variable displacement pump or to the flow-dividing valve fast enough. That means that the controlled-volume pump of the hydrostatic steering mechanism conveys more than the pump delivers for a short time, as a result of which the driver has to use increased physical effort to manipulate the steering wheel for a short time.

Furthermore, it is disadvantageous that in the known hydrostatic steering mechanism, the steering valve piston has to be deflected so far out of its normal path until the servo pressure is adjusted so high that the resistance at the steered wheels can be overcome. This means that the dead travel at the steering mechanism becomes relatively large if the axle load is high. When a steering cylinder with unbalanced piston chambers is used, reverse motion of the steering mechanism locked into the neutral position does not easily take place. For that reason, expensive additional devices must be provided.

SUMMARY OF THE INVENTION

Therefore, the object of the present invention is to create a hydrostatic steering device in which the operation under control is speeded up in such a way that no increased physical exertion is required to manipulate the steering wheel.

According to the invention, the control travel of the steering mechanism is used only for controlling either the variable displacement pump or the flow-dividing valve, and not for the steering pressure. When a flow-dividing valve for a second hydraulic circuit is present, the flow-dividing valve is controlled by a constant throttle. A pilot flow line branches off from the pressure delivery line to the hydrostatic steering mechanism through the constant throttle. The pressure compensator now lies in the pilot flow line and the return line to the reservoir, with the return to the reservoir being controlled by the adjustment throttle. That means that the pressure compensator is controlled by the adjustment throttle's differential pressure. By the diminution of the load signal with a control line between the constant throttle and the pressure compensator that leads to the pump and/or the flow-dividing valve, a rapid adjustment is achieved. By this means, the "power-shift" signal makes control of the pressure medium flow possible immediately after steering. That means that one obtains a rapid reaction of the controlled-volume pump with a feedback coupling to the power-shift signal. When that is done, the power-shift signal is independent of the steering pressure in the control line.

The pressure compensator includes a spring acting on one of its faces in which case the spring chamber is connected with the reservoir or an expansion reservoir through a return line, and the opposite face is acted upon by the pressure in front of the control throttle.

The adjustment throttle is connected mechanically with the controlled-volume pump in a known manner, with the adjustment throttle being influenced by the construction of the controlled-volume pump and the pressure in the line to the face opposite the spring being controlled thereby. That means that the pressure through the constant throttle lying in front of the pressure compensator becomes variable, and as a result, the pressure differential through the pressure compensator also becomes variable. In this way, the pressure differential is controlled through the constant throttle and the power-shift signal is controlled by the pump and the flow dividing valve.

A distinct advantage of the invention by comparison with the prior art results when the steering cylinder has unbalanced piston chambers, in which case, for the reverse motion of the steering wheel out of a locking position the piston chamber that is larger is connected, through the pressure delivery line, the constant throttle, the pressure compensator and the adjustment throttle, with the return conductor to the reservoir.

A reverse steering movement into the neutral position is obtained in a simple way, even with unbalanced piston chambers, by this embodiment, and this is done without expensive additional devices or using an expensive steering cylinder with balanced piston chambers.

In a further embodiment of the invention, provision is made for having the characteristic curve of the adjustment throttle linear with the excursion angle of the steering wheel.

By this measure taken in accordance with the invention, an absence of vibration and circular vibrations are avoided.

Provision can be made for the adjustment throttle to be integrated in the steering valve, and when that is done an opening for the flow of the pressure medium between the steering valve piston is formed.

The opening for the controlling process is changed linearly through the excursion lift or excursion angle of the steering mechanism, and the pressure is controlled linearly. That means that a certain height of lift of the steering piston corresponds to a certain angle of twist at the steering wheel. The desired linearity is obtained in a simple way by this measure.

It is advantageous if the adjustment piston of the pressure compensator is provided with a control bevel.

A kind of incline, and not a "black-and-white circuit" or an abrupt transition, is obtained by means of the control bevel. That means that the control is less susceptible to vibration.

In another embodiment of the invention, provision is made for keeping the differential pressure controlling the pressure compensator low by a weak construction of the spring.

As a result, the flow resistance becomes less, and consequently the energy balance becomes better. That means that the spring can be made relatively weak in general.

Advantageously, the hydrostatic steering device can also be combined with a second hydraulic circuit. Thus, provision is made for locating behind the pump a flow-dividing valve through which a second hydraulic circuit can be supplied with pressure medium. In that case, the control line also branches off to the flow control valve.

When a flow-dividing valve is used, the variable displacement pump can also be a fixed displacement pump because in that case the flow-dividing valve delivers the excess flow that is not needed for steering to the working hydraulic system. When that is the case, the corresponding control of the flow-dividing valve also takes place, according to the invention, as a result of the connection with the control conductor.

BRIEF DESCRIPTION OF THE FIGURES

In the following, a preferred embodiment of the invention is described in principle with the help of the drawings, in which.

DETAILED DESCRIPTION

Figure 1:
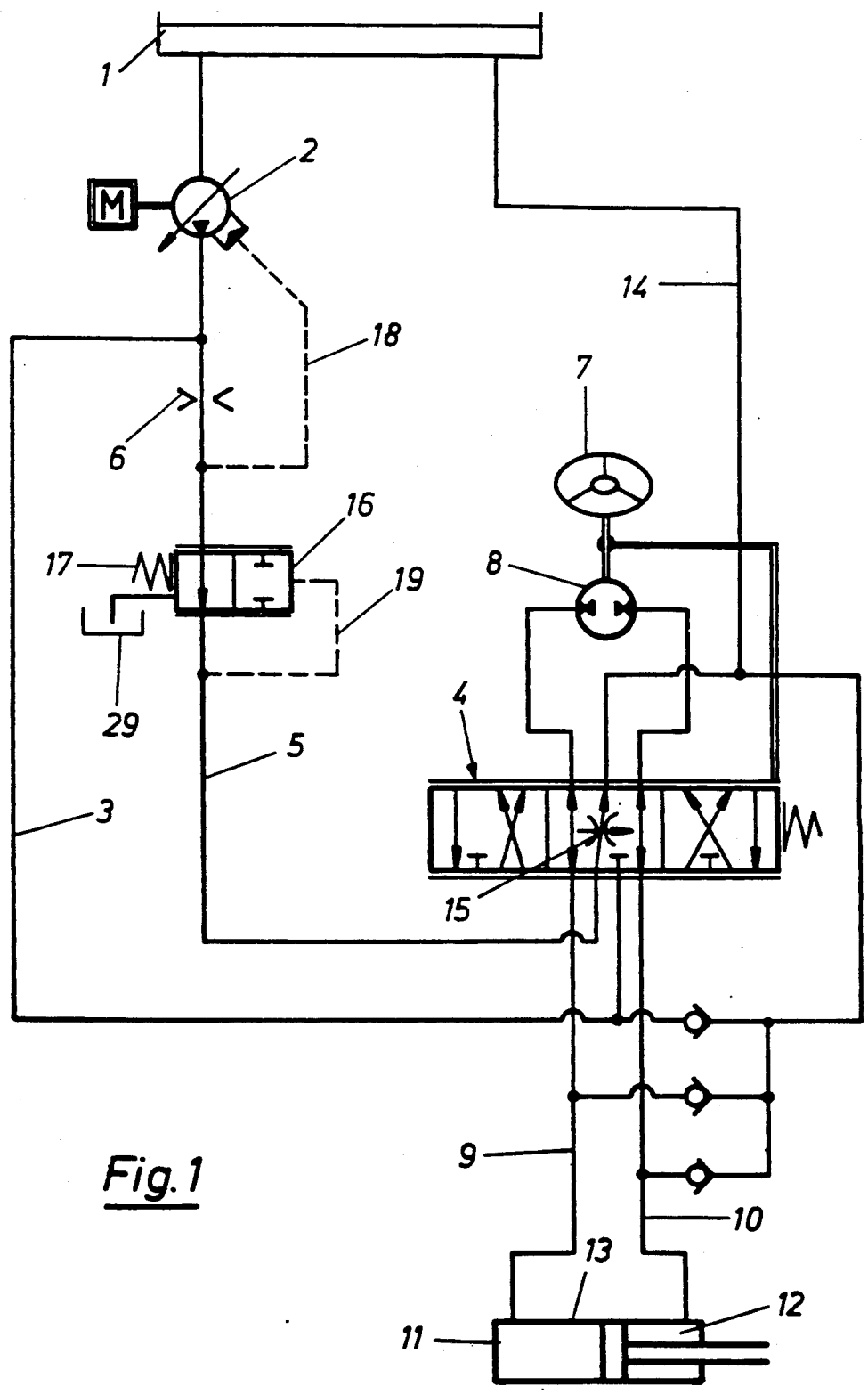
FIG. 1 shows the hydraulic circuit for a hydrostatic steering device.

Basically, the hydrostatic steering device is of known construction, and for that reason the steering mechanism itself is only briefly described. In the usual manner, it has a reservoir 1 from which a variable displacement pump 2 draws a pressure medium, which generally is oil. The pressure medium is conveyed to a steering valve 4 through a pressure delivery line 3. A pilot stream line 5 with a constant throttle 6 branches off from the pressure delivery line 3 beyond the pump 2. The displacement of the steering valve 4 takes place in the usual way as a result of turning of a steering wheel 7 that is connected mechanically with a controlled-volume pump 8. Pressure delivery lines 9 and 10 lead from the steering valve 4 to piston chambers 11 and 12 of a steering cylinder 13. Depending upon the direction in which the steering wheel 7 is turned and the adjustment of the steering valve 4 resulting therefrom, either the piston chamber 11 or the piston chamber 12 is supplied, with servo assistance, with pressure medium from the pressure delivery line 3 through the controlled-volume pump, while the other piston chamber is connected with the reservoir by a return line 14.

The return of the pressure medium from the pilot line 5 to the return line 14 to the tank 1 is regulated by an adjustment throttle 15 integrated into the steering valve 4. When that is the case, the adjustment throttle can easily be installed in the steering valve 4 in such a way that a guiding edge or opening is formed between the steering valve's housing and the valve piston.

In FIG. 1, the neutral position of the steering valve 4 is shown. If the steering valve 4 is moved to the left, for example, the pressure line 10 and, along with it, the piston chamber 12, receives pressure medium, while the piston chamber 11 is connected with the return line 14 through the pressure line 9 and the corresponding position of the steering valve 4. On the other hand, when the steering valve 4 is moved to the right, the pressure line 9 and, along with it, the piston chamber 11, receives pressure medium, while the pressure medium from the piston chamber 12 is pushed out into the return line 14 to the reservoir 1 through the pressure line 10.

A pressure compensator 16 with a spring 17 is installed in the pilot flow line 5 between the constant throttle 6 and the adjustment throttle 15. Between the constant throttle 6 and the pressure compensator 16, a control line 18 that leads back to the variable displacement pump branches off. That means that the load signal for controlling the variable displacement pump 2 has only a short distance to travel, resulting in independence from the steering pressure.

When that is the case, the effective surface of the pressure compensator 16 that is located opposite the spring 17 is acted upon by the pressure in front of the adjustment or regulating throttle 15.

The pressure differential through the pressure compensator 16 is variable because of the adjustment throttle 15, which is connected mechanically with the controlled-volume pump 8 in the usual manner. The load signal can be controlled appropriately in this manner.

Specifically, when there is a deflection by the steering wheel, the controlled-volume pump 8 is correspondingly activated and the adjustment throttle 15 cross-section is diminished. As a result, the pressure in the regulating line 19, which is acted upon by the pressure of the pilot flow line 5 behind the pressure compensator 16, also increases. The pressure compensator is adjusted appropriately against the force of the spring 17 by this increase of the pressure, so that a pressure drop is generated in front of the pressure compensator 16, and, in fact, it is a pressure drop corresponding to the resistance at the steering cylinder 13. In this manner, the working pressure in the pressure delivery line 3 that is required for displacement at the steering cylinder 13 is adjusted automatically. The regulating pressure for the variable displacement pump 2 is determined by the stream of pressure medium that flows through the constant throttle 6.

The regulating processes that are described above are related to active steering.

Normally, with unbalanced steering cylinders—that is, with steering cylinders having piston chambers 11 and 12 of different sizes—there is the problem that no return to the neutral position can take place in an easy manner.

However, in contrast with the known devices, the column of the pressure medium from the larger piston chamber 11 of the inventive device can flow through the controlled-volume pump 8, the constant throttle 6, the pressure compensator 16 and the adjustment throttle 15 to the reservoir when the steering valve is slightly deflected. That means that when the steering wheel is released (i.e. during inactive steering), the pressure medium flows in a direction opposite to the direction in active steering. When that is the case, the variable displacement pump 2 is rotated back, so that it does not deliver any conveying flow any longer because the load signal that influences the variable displacement pump is taken over by the pressure medium running back through the constant diagram 6.

Figure 2:
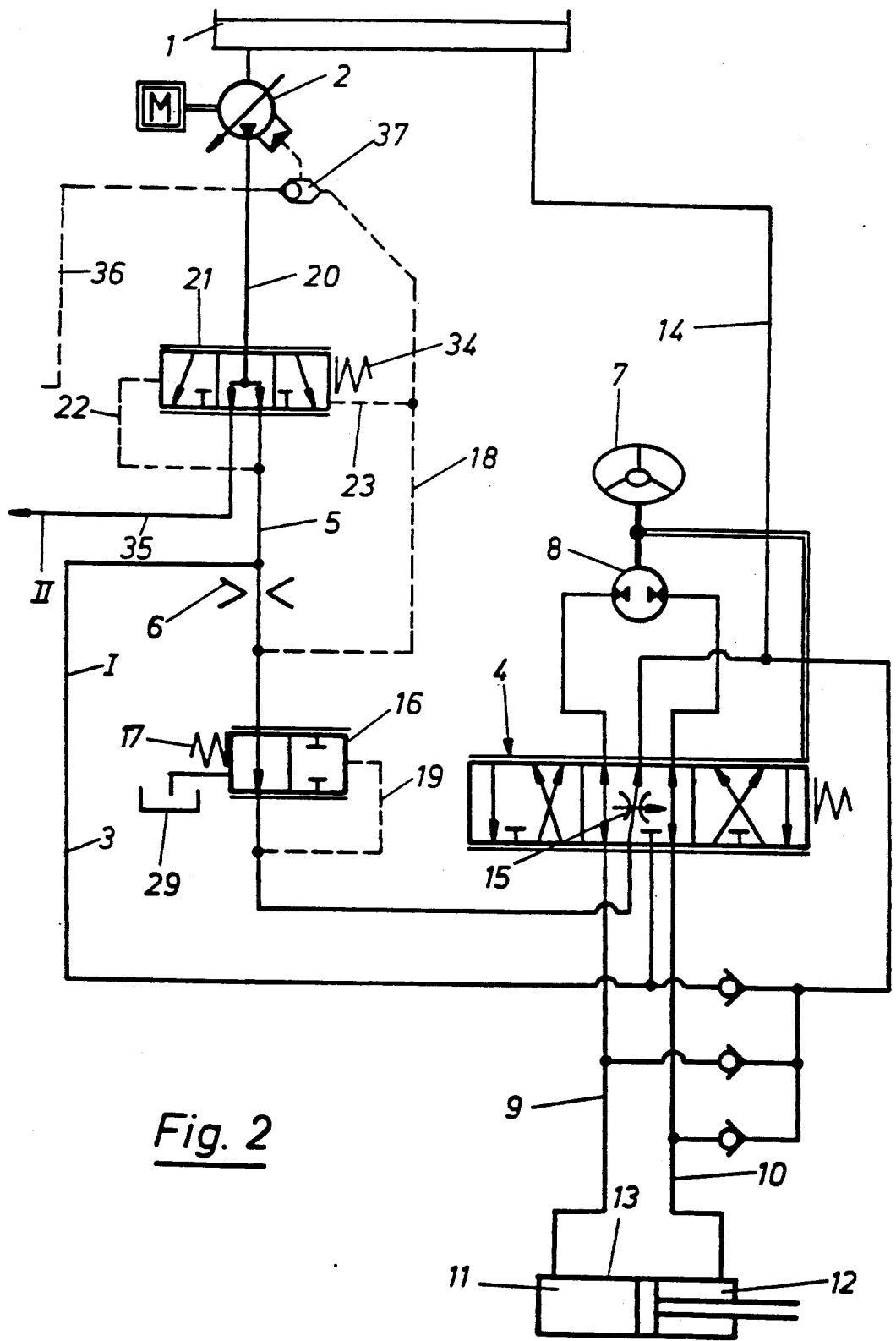
FIG. 2 shows the hydraulic circuit according to FIG. 1 with a flow-dividing valve for a second hydraulic circuit.

The hydraulic circuit shown in FIG. 2 is similar with respect to the invention of the same construction, and for that reason the same reference numbers were taken over. The sole difference consists only of the fact that dividing of the flow of pressure medium into the pressure delivery line 3 and another pressure line 35 to a second working circuit II takes place beyond the variable displacement pump. A flow-dividing valve 21 is located in the pressure line 20. The flow-dividing valve 21 is also of a known design (see DE-PS 27 16 868, for example), and it is constructed in such a way that the working circuit I has priority for steering. For this purpose, the pilot stream line 5 is led through the flow-dividing valve 21 with an additional control line 22. The control line 18, which leads back to the variable displacement pump 2, has another branch line 23 to control the flow-dividing valve 21. Furthermore, the variable displacement pump can also be influenced and swung out by an LS steering mechanism 36 through an interchangeable relief valve 37.

The control signal for swinging out the pump is generated by the user with the highest system pressure. The priority of the steering mechanism is ensured by the flow-dividing valve 21. Thus the load signal of the steering mechanism can also adjust the variable displacement pump, but it adjusts the flow-dividing valve 21 in any case. When that is the case, moreover, the pressure compensator 16 functions in the same way as the one in the hydraulic circuit described in FIG. 1.

Figure 3:
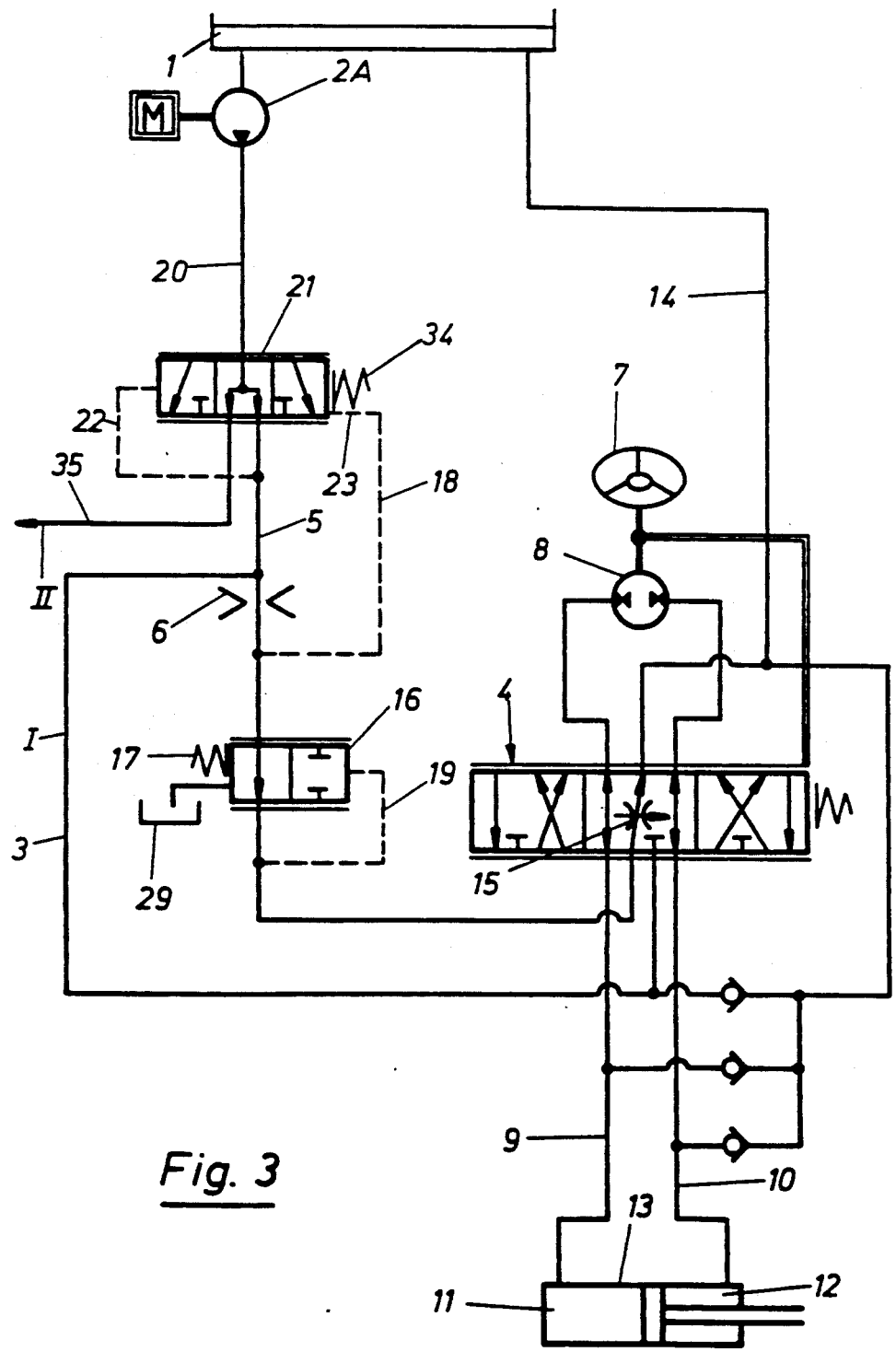
FIG. 3 shows the hydraulic circuit according to FIG. 2 with a fixed displacement pump.

The hydraulic circuit shown in FIG. 3 also shows a circuit with a working circuit I for a steering mechanism and a working circuit II for a working hydraulic system. In contrast with the example shown in FIG. 2, however, a fixed displacement pump 2A is used instead of a variable displacement pump 2. In that case, the control line 18 only leads to the flow-dividing valve that controls the division of the pressure medium flow into the pressure delivery line 3 for the steering mechanism and the pressure line 20 for the second working circuit by that means.

Thus, only a division of the constant flow conveyed by the pump is required here, with the flow flowing to the steering mechanism varying according to the speed of rotation at the steering wheel. The pressure compensator 16 functions in the same way as in the hydraulic circuits in accordance with FIGS. 1 and 2.

Figure 4:
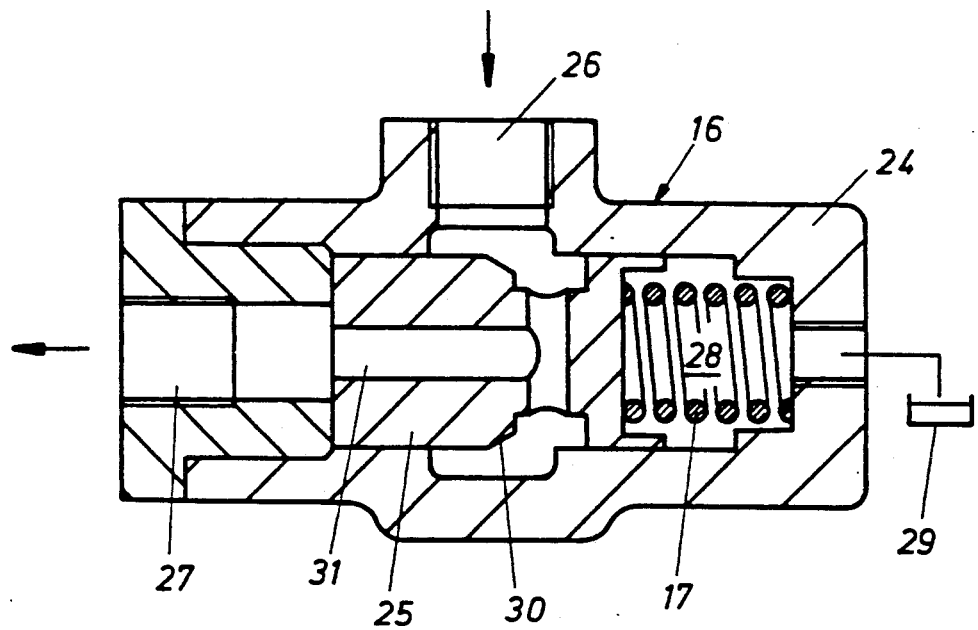
FIG. 4 shows a longitudinal section through the pressure compensator according to the invention.

In FIG. 4, a practical embodiment for the pressure compensator 16 according to the invention is shown. It has a housing 24 with an adjustment plunger 25 inside it. A connection with the constant throttle 6 is provided through an intake opening 26, while the pilot stream line 5 is connected with an outlet opening 27 that leads to the steering valve 4. A spring 17 is in a spring chamber 28 that is connected with an expansion reservoir 29 for the equalization of pressure on a face of the adjustment plunger 25. The pressure in the pilot stream line 5 beyond the pressure compensator 16 acts on the opposite face of the adjustment plunger 25 as a counteracting force. That pressure corresponds to the pressure at the adjustment throttle 15.

As can be seen, the adjustment plunger 25 is provided with a control bevel or chamfer 30, and consequently an incline, and therefore a gradual transition, between the intake opening 26 and the outlet opening 27, comes into being through the connecting drilled hole 31 inside the adjustment plunger 25.

Figure 5:
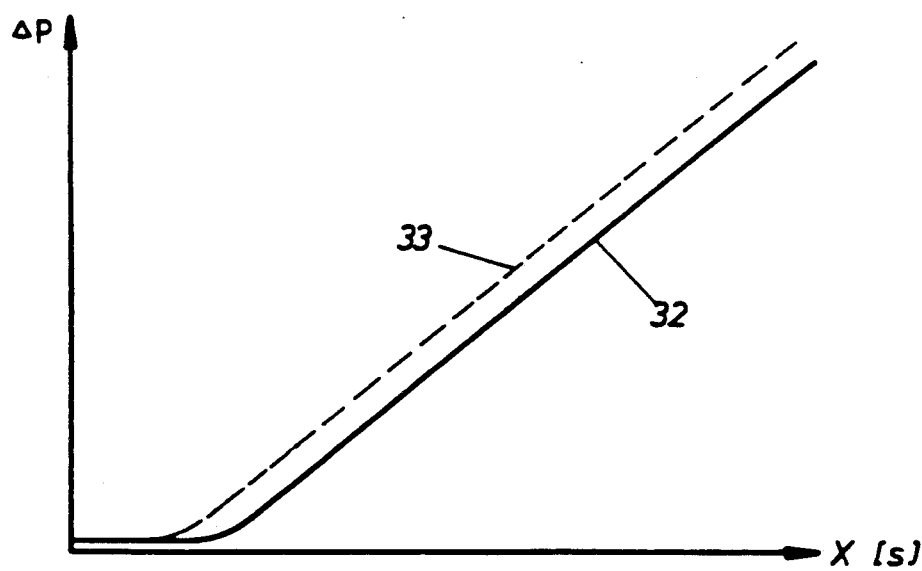
FIG. 5 shows a graphical representation of pressure versus displacement of the adjustment throttle.

In FIG. 5, the characteristic curve 32 of the adjustment throttle and/or the valve lift over the adjusting path and the pressure differential is shown. As can be seen, it runs linearly. The broken line next to it is the characteristic curve 33 of the control angle at the steering wheel. As can be seen, a direct and linear mutual dependency of the two characteristic curves is provided by that means. The pressure is controlled linearly, with a certain displacement path of the steering valve 4 corresponding to a certain angle of twist at the steering wheel 7.

I claim:

1. In a hydrostatic steering device including a pump (2) connected with a reservoir (1), a steering valve (4) connected with said pump via a variable pressure line (3) and a constant pilot line (5), a controlled-volume pump (8) activated by a steering wheel and connected with said steering valve, a steering cylinder (13) connected with said steering valve, a constant throttle connected with said pilot line to produce a pressure drop which serves as a control signal for the flow in said variable pressure line, an adjustment throttle (15) connected with said pilot line and arranged in said steering valve for connection with said controlled-volume pump, the improvement which comprises
   (a) a pressure compensator (16) connected with said pilot line between said constant and adjustment throttles, said compensator being controlled by a differential pressure of said adjustment throttle; and
   (b) a control line (18) connected with said pilot line between said constant throttle and said compensator and with said pump for delivering said control signal to said pump.

2. A hydrostatic steering device as defined in claim 1, wherein said pressure compensator includes a spring (17) which biases one face of said compensator, the other face of said compensator being biased by the pressure from said adjustment throttle.

3. A hydrostatic steering device as defined in claim 1, wherein said adjustment throttle has a characteristic curve which is linear with the excursion angle of the steering wheel.

4. A hydrostatic steering device as defined in claim 2, wherein said adjustment throttle contains an opening affording communication of hydraulic fluid between a housing and a plunger of said steering valve.

5. A hydrostatic steering device as defined in claim 3, wherein said pressure compensator contains an adjustment plunger (25) having a control bevel (30).

6. A hydrostatic steering device as defined in claim 2, wherein said spring is a weak spring, whereby the differential pressure controlling said pressure compensator is kept low.

7. A hydrostatic steering device as defined in claim 1, wherein said pump comprises a fixed displacement pump, and further comprising a flow-divider valve (21) connected with said pump for dividing said hydraulic fluid between two circuits (I, II), said control line being connected with said flow-divider valve to control the pressure in each circuit.

* * * * *